UNITED STATES PATENT OFFICE.

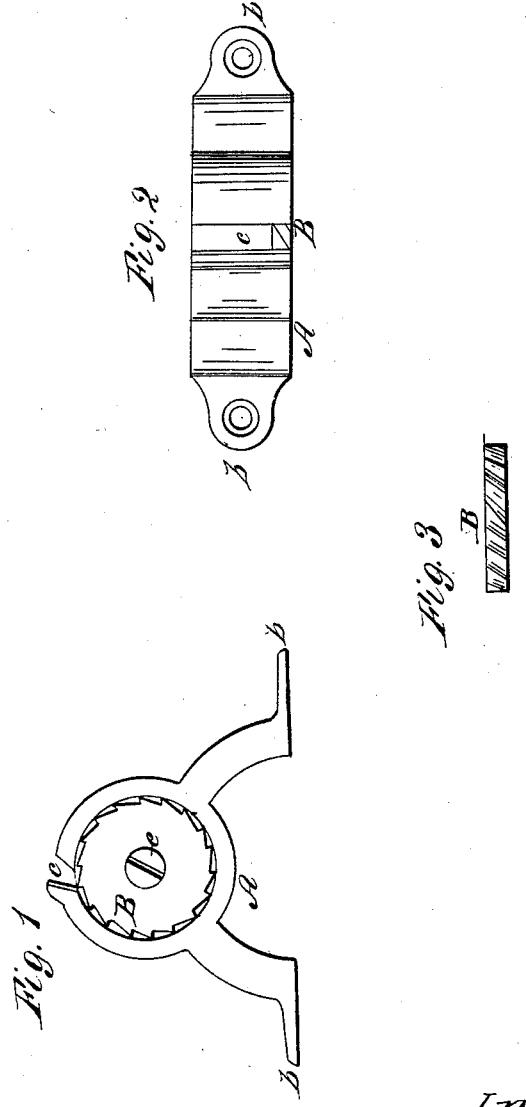

T. T. PROSSER AND JAS. LAWSON, OF CHICAGO, ILLINOIS.

IMPROVED KNIFE AND SCISSORS SHARPENER.

Specification forming part of Letters Patent No. 57,564, dated August 28, 1866.

*To all whom it may concern:*

Be it known that we, TREAT T. PROSSER and JAMES LAWSON, of Chicago, in the county of Cook and State of Illinois, have invented certain new and useful Improvements in Scissors-Sharpeners; and we do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, we will proceed to describe it.

Figure 1 is a front elevation; Fig. 2, a top-plan view, and Fig. 3 an edge view of a portion detached.

A represents a frame, which may be made of cast-iron, and, if desired, may be provided with the flanges $b$, having holes therein for screwing it fast to the table, or wherever it is to be used.

B represents a steel disk fitted into a circular recess formed in the face of the frame A to receive it, as shown in Fig. 1, and being held therein by a screw, $e$, upon which the disk B may be turned as desired.

The periphery of this disk B consists of a series of notches in the form of saw-teeth, as shown in Fig. 1. These teeth extend diagonally across the edge of the disk, as shown in Fig. 3.

A notch, $c$, is formed in the upper face of the frame A at right angles to its front face, the bottom of said notch being slightly lower than the upper edge of the teeth on the disk B, so that when a blade of a pair of scissors or shears is placed in the notch and drawn across the tooth of the disk the edge of the tooth, projecting slightly above the bottom of the notch, will scrape or cut a very fine shaving off the blade, thereby sharpening it.

By having the teeth placed diagonally across the edge of the disk, it will be seen that when the blade is drawn at right angles across the disk the tooth of the latter will have a shear cut on the edge of the blade instead of scraping at right angles to the edge of the blade, as in the case of the usual smooth-edged disk used for that purpose.

It will be further observed that the recess or notch between the cutting-tooth and the one immediately to its left forms a channel, through which the chips or shavings may escape to the front out of the way, and that the bottom of the notch $c$ forms a guide, upon which the edge of the blade rests while being drawn across the face of the tooth, whereby the blade is prevented from dropping down when a notch in the blade comes over the tooth, as it would if not thus supported by bottom of the notch. By this means all notches or nicks may be removed from the edge of the blade, as it is evident that the tooth cannot cut the blade at any such point, as the blade will be supported by the rest, so as to prevent it from dropping down when the notch comes over the tooth.

By notching the edge of the disk in the inclined or diagonal manner shown more cutting-surface is provided than could be if the cutting-edge were a continuous line extending around the periphery of the disk in the usual manner.

The vertical face on the left of the notch $c$ may be inclined at any desired angle to the face or edge of the disk B when made, it being obvious that the inclination of this face will regulate the angle or inclination of the blade when sharpened.

To use our invention it is only necessary to place the edge of the blade downward in the notch $c$, and draw it backward across the face or edge of the tooth until it becomes sufficiently sharp. When one of the teeth becomes dulled the disk can be turned so as to bring a fresh tooth into operation.

Having thus described our invention, what we claim is—

The toothed disk B, in combination with the frame A, having the notch $c$ formed therein, when said parts are arranged to operate as and for the purpose set forth.

T. T. PROSSER.
JAS. LAWSON.

Witnesses:
P. A. HOYRE,
A. T. SHERMAN.